United States Patent
Whitaker

(10) Patent No.: US 11,840,638 B2
(45) Date of Patent: Dec. 12, 2023

(54) THERMAL ROAD MARKING COMPOUND FORMULATION

(71) Applicant: Dustin Whitaker, Childress, TX (US)

(72) Inventor: Dustin Whitaker, Childress, TX (US)

(73) Assignee: Eco Path Striping LLC, Tyler, TX (US)

( * ) Notice: Subject to any disclaimer, the term of this patent is extended or adjusted under 35 U.S.C. 154(b) by 0 days.

(21) Appl. No.: 18/169,360

(22) Filed: Feb. 15, 2023

(65) Prior Publication Data

US 2023/0303887 A1   Sep. 28, 2023

Related U.S. Application Data

(63) Continuation-in-part of application No. 17/705,326, filed on Mar. 27, 2022.

(51) Int. Cl.
| | |
|---|---|
| C09D 167/03 | (2006.01) |
| C09D 7/61 | (2018.01) |
| C09D 7/40 | (2018.01) |

(52) U.S. Cl.
CPC ............ *C09D 167/03* (2013.01); *C09D 7/61* (2018.01); *C09D 7/69* (2018.01); *C09D 7/70* (2018.01)

(58) Field of Classification Search
CPC .......... C09D 167/03; C09D 7/69; C09D 7/61; C09D 7/70

USPC ....................................................... 106/31.04
See application file for complete search history.

(56) References Cited

U.S. PATENT DOCUMENTS

2011/0253152 A1* 10/2011 Lin ................... D04H 1/4291
128/849

* cited by examiner

*Primary Examiner* — James E McDonough
(74) *Attorney, Agent, or Firm* — Shannon Warren

(57) ABSTRACT

A method of manufacture for an improved composition for melt-bonding road marking compound is disclosed. Comprising preparing a PET component from pulverized recycled plastic. combining the PET component, a pigment component, a filler component, a silica component and a binder component to form a road marking compound. melting the road marking compound form the melt-bonding road marking compound. selecting an amount of the PET component to maximize PET in the melt-bonding road marking compound while ensuring the melt-bonding road marking compound remains liquid for application to a road surface. The PET component comprises glass beads, is substantially clear, and substantially spherical. The PET component comprises glass beads. The method of manufacture comprises optimizing a bead diameter of the PET component to ensure the melt-bonding road marking compound can flow through screens and nozzles in a typical road paint application equipment.

13 Claims, 5 Drawing Sheets

| Components (302) | Example Material (304) | Percent of Weight Low (306) | Percent of Weight High (308) |
|---|---|---|---|
| Additives Component (122) | PET | 1 | 20 |
| Silica Component (118) | Glass beads | 30 | 45 |
| Pigment Component (126) | Titanium Dioxide | 8 | 15 |
| Filler Component (128) | Calcium carbonate | 20 | 42 |
| Binder Component (120) | Ester of rosin | 18 | 23 |

| Components (302) | Example Material (304) | Percent of Weight Low (306) | Percent of Weight High (308) |
|---|---|---|---|
| Additives Component (122) | PET | 1 | 20 |
| Silica Component (118) | Glass beads | 30 | 45 |
| Pigment Component (126) | Chrome yellow 83 | 1 | 1.5 |
| Filler Component (128) | Calcium carbonate | 20 | 42 |
| Binder Component (120) | Ester of rosin | 18 | 23 |

| US Sieve No (502) | Diameter (504) | Mass % Passing Low (506) | Mass % Passing High (508) |
|---|---|---|---|
| 16 | 1180 | 100 | 100 |
| 20 | 850 | 95 | 100 |
| 30 | 595 | 75 | 95 |
| 50 | 297 | 15 | 35 |
| 100 | 149 | 0 | 5 |

FIG. 5

THERMAL ROAD MARKING COMPOUND FORMULATION

CROSS-REFERENCE TO RELATED APPLICATIONS

This application claims benefit to U.S. nonprovisional utility patent application Ser. No. 17/705,326 filed 2022 Mar. 27, which is incorporated by reference.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The present invention relates to paint compositions in general, and to a road marking paint composition.

Road marking paints and thermal compounds are typically utilized for marking lanes, pedestrians' crossings, etc. on roads. Essential components of conventional melt-bonding (or hot melt) road marking paint include a thermoplastic resin (binder), a pigment, glass beads, and a filler.

Melt-bonding road marking compounds typically come in a powder form. Before application, the road marking paint powder is initially melted in a hot melt kettle. The molten road marking paint can then be applied (typically via spraying) onto a road surface to form the desired shape for road markings. The road marking paint coated on the road surface will be cooled and solidified in a few minutes.

The road marking compounds is required to have properties such as fast drying, wear resistance, and diffusive reflectivity, and strong peel strength after solidification.

The present disclose provides an improved composition for melt-bonding road marking compounds.

Essential components of conventional melt-bonding road marking paint include a thermoplastic resin, a pigment along with a plasticizer, a silica in the form of glass beads, and a filler.

Thermoplastic resins allow the road marking paint to be fast-drying and strongly adhesive to a road surface. Two most common pigment colors are white and yellow. White pigments are mainly titanium dioxide, zinc oxide, and lithophone. Yellow pigment is mainly heat resistant yellow lead. The fillers ensure mechanical strength, wear resistance, and color of paint coating. Glass beads, which are generally colorless and transparent, provide light refraction, focusing and directional reflection. Dispensed throughout the road paint coating surface, glass beads can reflect car light back to drivers' eyes to improve visibility of road markings.

Disclosed herein is an improved composition for a melt-bonding road marking paint 130, as discussed below.

No prior art is known to the Applicant.

BRIEF SUMMARY OF THE INVENTION

A first embodiment of a method of manufacture for melt-bonding road marking compound is disclosed.

Said method of manufacture comprises: preparing a PET component from pulverized recycled plastic. combining said PET component, a pigment component, a filler component, a silica component and a binder component to form a road marking compound. melting said road marking compound form said melt-bonding road marking compound. selecting an amount of said PET component to maximize PET in said melt-bonding road marking compound while ensuring said melt-bonding road marking compound remains liquid for application to a road surface. Said PET component comprises glass beads, is substantially clear, and substantially spherical. Said PET component comprises glass beads. Said method of manufacture comprises optimizing a bead diameter of said PET component to ensure said melt-bonding road marking compound can flow through screens and nozzles in a typical road paint application equipment. Said PET component comprises said bead diameter of 400-750 microns. Said melt-bonding road marking compound comprises, as a percentage by weight: said silica component comprising 30-45% glass beads, said filler component comprising 20-42% calcium carbonate, said binder component comprising 18-23% thermoplastic resins, and said PET component comprising 1-20% polyethylene terephthalate.

A second embodiment of said method of manufacture for said melt-bonding road marking compound is disclosed.

Said method of manufacture comprises: preparing said PET component from pulverized recycled plastic. combining said PET component, said pigment component, said filler component, said silica component and said binder component to form said road marking compound. melting said road marking compound form said melt-bonding road marking compound.

A third embodiment of said method of manufacture for said melt-bonding road marking compound is disclosed.

Said method of manufacture comprises: combining said PET component, said pigment component, said filler component, said silica component and said binder component to form said road marking compound. melting said road marking compound form said melt-bonding road marking compound. selecting an amount of said PET component to maximize PET in said melt-bonding road marking compound while ensuring said melt-bonding road marking compound remains liquid for application to a road surface.

BRIEF DESCRIPTION OF THE SEVERAL VIEWS OF THE DRAWING

FIG. 5 illustrates a third table 500.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
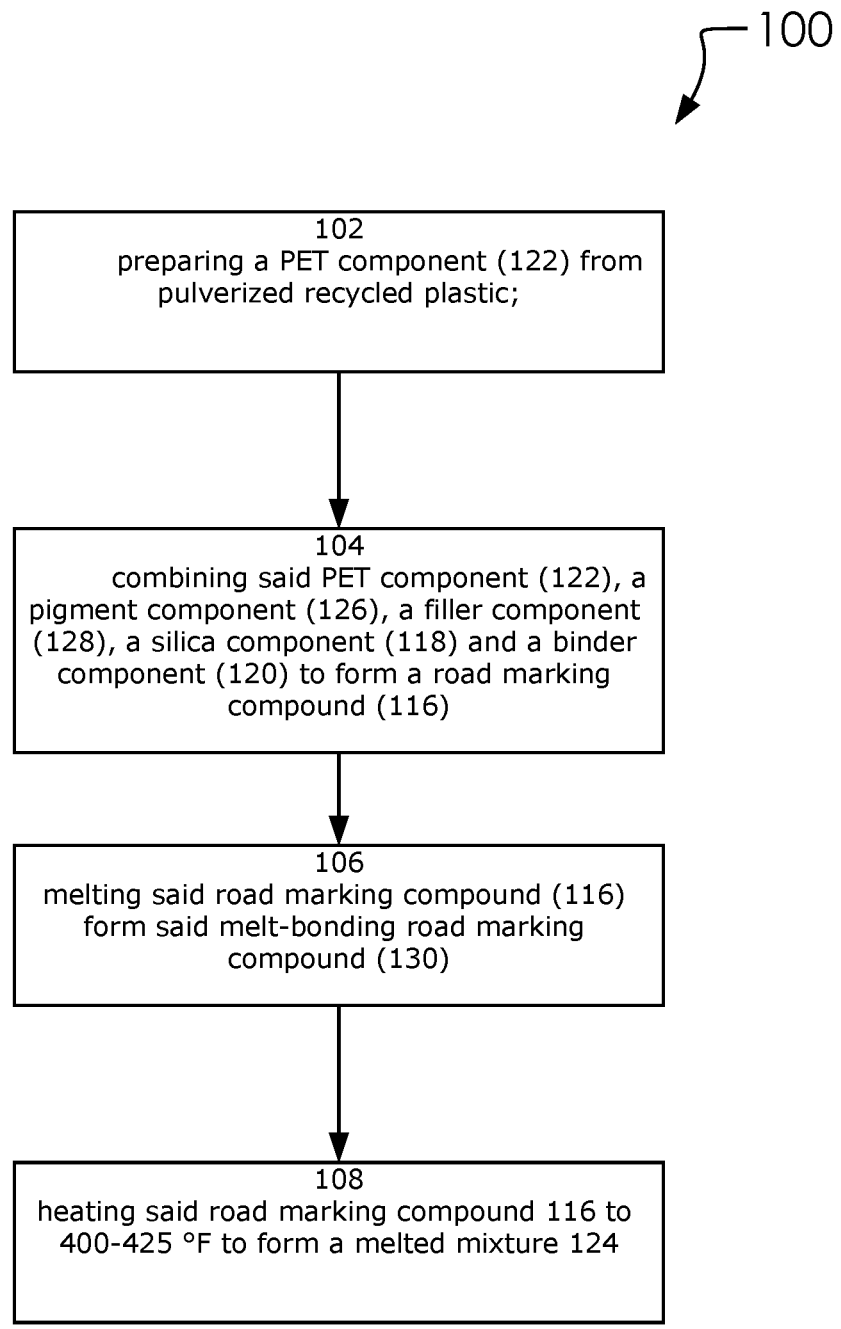
FIG. 1 illustrates a method of manufacture 100.

FIG. 1 illustrates a method of manufacture 100.

In one embodiment, said method of manufacture 100 can comprise a first step 102 comprising preparing a PET component 122 from pulverized recycled plastic; second step 104 can comprise combining said PET component 122, a pigment component 126, a filler component 128, a silica component 118 and a binder component 120 to form a road marking compound 116; and third step 106 can comprise melting said road marking compound 116 form melt-bonding road marking compound 130.

Said method of manufacture 100 can further comprise fourth step 108 can comprise heating said road marking compound 116 to 400-425° F. to form a melted mixture 124.

Once prepared in said method of manufacture 100, said melt-bonding road marking compound 130 can be applied as said melted mixture 124 through a pump and air atomization to a road surface.

One feature of said method of manufacture 100, as discussed below, is the selection of inputs of said filler component 128 and said PET component 122 to ensure fluidity of said melt-bonding road marking compound 130 and maximizing the inclusion of said PET component 122.

Said PET component 122 can comprise Polyethylene terephthalate (or poly(ethylene terephthalate). Also known as PETE, or the obsolete PETP or PET-P), is the most common thermoplastic polymer resin of the polyester family and is used in fibers for clothing, containers for liquids and foods, and thermoforming for manufacturing, and in combination with glass fiber for engineering resins. It can include other polyethylene compounds or plastics, as is known in the art.

The parent application to this filing (Ser. No. 17/705,326) (incorporated by reference) discusses the formulation of a road marking paint. One advantage of said melt-bonding road marking compound 130 can comprise the maximization of PET which can come from recycled materials.

One limitation of maximizing PET can comprise the side effect of losing liquid fluidity should too much or too large an input PET be used for said PET component 122. By maximizing PET, said melt-bonding road marking compound 130 can increase durability while enhancing the environmental benefits of said melt-bonding road marking compound 130.

The Applicant also hereby discloses and intends to claim a formulation of a tape compound able to hold an even higher percentage of said PET component 122 being an ideal material to incorporate additional recycled materials. Tape need not pass a flowability requirement since it is not a liquid. This thermal plastic formation, therefore, will be more economic and ecological.

Figure 2:
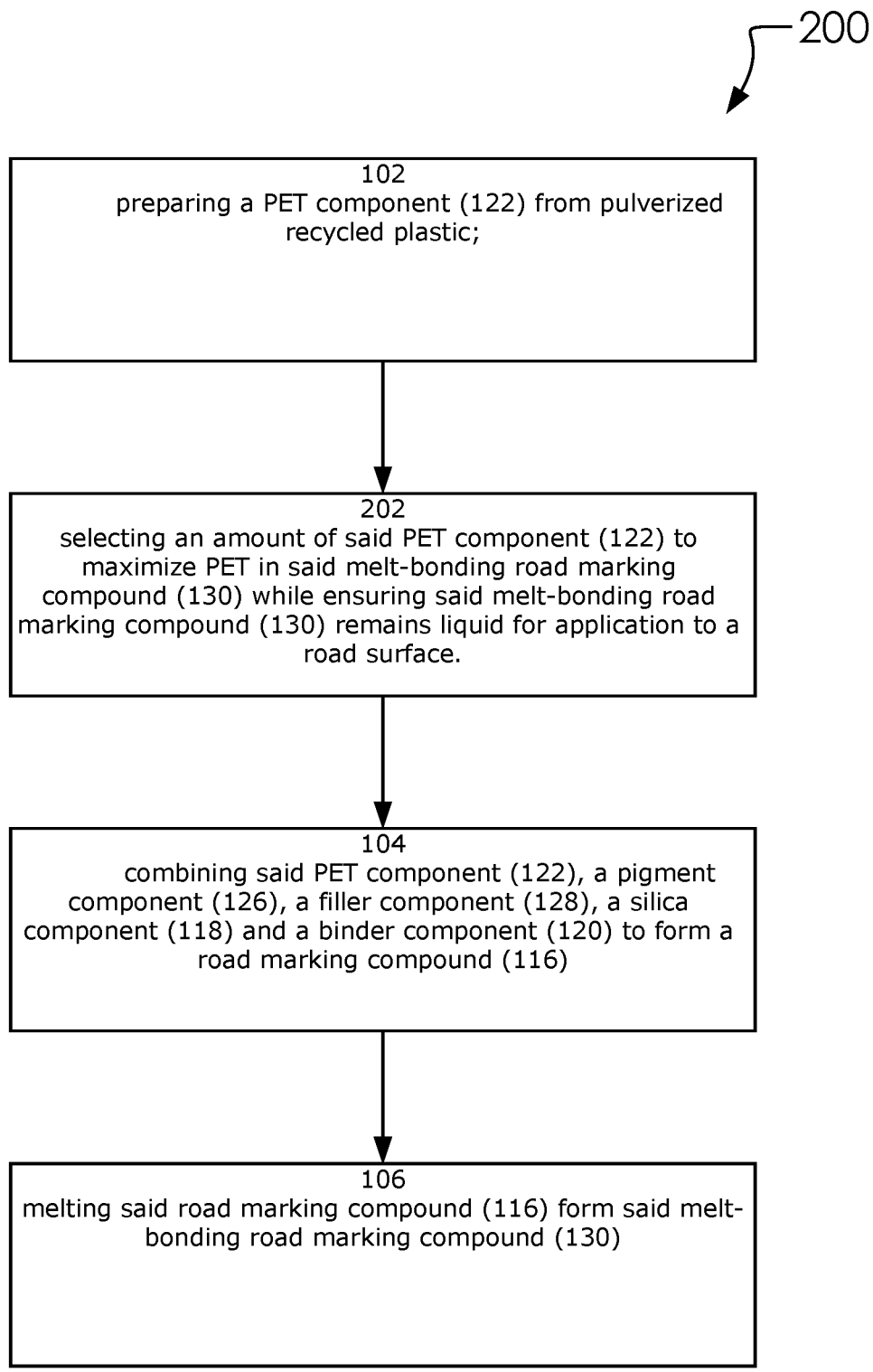
FIG. 2 illustrates said method of manufacture 100 with first step 202.

FIG. 2 illustrates said method of manufacture 100 with first step 202.

Said method of manufacture 100 can further comprise said first step 202 comprising selecting an amount of said PET component 122 to maximize PET in said melt-bonding road marking compound 130 while ensuring said melt-bonding road marking compound 130 remains liquid for application to a road surface.

Figure 3:
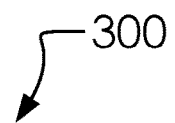
FIG. 3 illustrates a first table 300.

FIG. 3 illustrates a first table 300.

Said first table 300 can comprise a components column 302, an example material column 304, a low percentage by weight column 306, and a high percentage by weight column 308. In one embodiment, said low percentage by weight column 306 and said high percentage by weight column 308 can comprise lower and upper limits of each component as described in said components column 302, respectively. In one embodiment, a formulation of said melt-bonding road marking compound 130 can comprise said method of manufacture 100 by weight as a combination of components selected among said components column 302.

Said first table 300 can comprise a composition of said melt-bonding road marking compound 130 in a white color, in in percentages by weight.

In accordance with one embodiment of the present invention, polyethylene terephthalate (PET or PETE) is utilized as said PET component 122 for manufacturing said melt-bonding road marking compound 130. PET is a polymer resin of the polyester family. The main source of PET can be recycled plastic water bottles. In addition, being an additive, PET also replace the certain amount of thermoplastic resin, glass beads and filler needed to be employed in conventional melt-bonding paint compositions. For example, the percentage of PET used in the paint composition may replace the same amount of silica glass beads and or calcium carbonate filler.

Components of white color of said melt-bonding road marking compound 130 include said silica component 118, said binder component 120, said PET component 122, said pigment component 126, and said filler component 128.

Wherein, said pigment component 126 can comprise a white pigment from a rutile titanium dioxide that meets the ASTM D 476, Type II or V standard. A maximum of 17% of the total white pigment content may be ASTM D 476 Type I anatase titanium dioxide. When washed free of resins by solvent washing, pigments should meet U.S. Standard Sieve Number 200.

Said silica component 118 can comprise glass beads which can comprise an index of refraction between 1.50 and 1.53 at 25° C. Glass beads should meet the requirement of AASHTO M247 Type 1.

Said filler component 128 can comprise calcium carbonate of 95% purity.

Said binder component 120 can comprise a mixture of thermoplastic resins, at least one of which is a solid at room temperature. At least ⅓ of the binder composition can comprise a maleic-modified glyceryl ester of rosin, and not less than 8% by weight of the entire material composition.

Finally, said PET component 122 can comprise PET formed by pulverizing clear recycled plastic into micron size beads.

Figure 4:
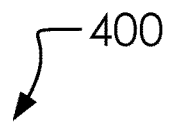
FIG. 4 illustrates a second table 400.

FIG. 4 illustrates a second table 400.

As discussed above, said second table 400 can comprise columns 302-308 just as said first table 300.

Said second table 400 can comprise a composition of said melt-bonding road marking compound 130 in a yellow color, in in percentages by weight.

Components of yellow color of said melt-bonding road marking compound 130 can include said silica component 118, said binder component 120, said PET component 122, said pigment component 126, and said filler component 128.

Said pigment component 126 can comprise a lead and chromate free, organic yellow pigment that is heat-resistant, such as C.I. Pigment Yellow 83, opaque version.

Said silica component 118 can comprise glass beads should have an index of refraction between 1.50 and 1.53 at 25° C. Glass beads should meet the requirement of AASHTO M247 Type 1.

Said filler component 128 can comprise calcium carbonate of 95% purity.

Said binder component 120 can comprise a mixture of thermoplastic resins, at least one of which is a solid at room temperature. At least ⅓ of the binder composition is a maleic-modified glyceryl ester of rosin, and not less than 8% by weight of the entire material composition.

Said PET component 122 can comprise PET formed pulverizing clear recycled plastic into micron size beads.

As has been described, the present invention provides an improved composition of said melt-bonding road marking compound 130. The usage of PET in the form of recycled plastic can lessen the cost of making said melt-bonding road marking compound 130. In addition, since the source of PET comes from recycled plastic bottles, the present invention helps remove excess waste plastics from the environment.

While the invention has been particularly shown and described with reference to a preferred embodiment, it will be understood by those skilled in the art that various changes in form and detail may be made therein without departing from the spirit and scope of the invention.

FIG. 5 illustrates a third table 500.

Said third table 500 can comprise a graduation of PET chart related to the size and mass of said PET component 122.

Said third table 500 illustrates four columns: viz., A US Sieve number 502, a bead diameter 504 in microns, a mass percentage low 506 and a mass percentage high 508. Wherein, said mass percentage low 506 and said mass percentage high 508 are understood to represent a range of percentages.

In one embodiment, said PET component 122 can comprise glass beads, can be substantially clear, and substantially spherical.

Said PET component 122 can comprise AASHTO M247-11 TYPE 1 glass beads and can be tested in accordance to ASTM D1214 and AASHTO PP-74-13.

In one embodiment, said method of manufacture 100 can comprise optimizing said bead diameter 504 of said PET component 122 to ensure said melt-bonding road marking compound 130 can flow through screens and nozzles in a typical road paint application equipment.

In one embodiment, said PET component 122 can comprise said bead diameter 504 of 400-750 microns.

Said method of manufacture 100 can further comprise optimizing a portion of said PET component 122 in said melt-bonding road marking compound 130 to maximize PET in said melt-bonding road marking compound 130 while ensuring said melt-bonding road marking compound 130 remains liquid for application to a road surface. One feature of said method of manufacture 100 can comprise reducing said filler component 128 and increasing said PET component 122 to improve wearability of said melt-bonding road marking compound 130 on the road and to increase the use of recycled materials to improve the environmental profile of our nation's roadways.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

PARTS LIST said method of manufacture 100,
Said first step 102,
Said PET component 122,
Said second step 104,
Said pigment component 126,
Said filler component 128,
Said silica component 118,
Said binder component 120,
Said road marking compound 116,
Said third step 106,
Said melt-bonding road marking compound 130,
Said fourth step 108,
Said melted mixture 124,
Said first step 202,
Said first table 300,
Said components column 302,
Said example material column 304,
Said low percentage by weight column 306,
Said high percentage by weight column 308,
Said second table 400,
Said third table 500,
Said US Sieve number 502,
Said bead diameter 504,
Said mass percentage low 506,
Said mass percentage high 508,
Fifth step 110,
Molten state 132,
Alternative method of manufacture 200,
Second step 204, and
third step 206.

The invention claimed is:

1. A method of manufacture for an improved composition for melt-bonding road marking compound comprising:
   preparing a PET component from pulverized recycled plastic;
   combining said PET component, a pigment component, a filler component, a silica component and a binder component to form a road marking compound; and
   melting said road marking compound form said melt-bonding road marking compound.

2. The method of manufacture of claim 1, further comprising:
   selecting an amount of said PET component to maximize PET in said melt-bonding road marking compound while ensuring said melt-bonding road marking compound remains liquid for application to a road surface.

3. The method of manufacture of claim 2, wherein:
   said PET component comprises glass beads, is substantially clear, and substantially spherical.

4. The method of manufacture of claim 2, wherein:
said PET component comprises glass beads; and
said method of manufacture comprises optimizing a bead diameter of said PET component to ensure said melt-bonding road marking compound can flow through screens and nozzles in a typical road paint application equipment.

5. The method of manufacture of claim 4, wherein:
said PET component comprises said bead diameter of 400-750 microns.

6. The method of manufacture of claim 2, wherein:
said melt-bonding road marking compound comprises, as a percentage by weight:
said silica component comprising 30-45% glass beads,
Said filler component comprising 20-42% calcium carbonate,
Said binder component comprising 18-23% thermoplastic resins, and
and said PET component comprising 1-20% polyethylene terephthalate.

7. The method of manufacture of claim 6, wherein:
said pigment component comprising 8-15% titanium dioxide.

8. The method of manufacture of claim 6, wherein:
said pigment component comprising 1-1.5% chrome yellow 83.

9. The method of manufacture of claim 1, wherein:
melting said road marking compound into a melted mixture comprises heating said road marking compound to 400-425° F.

10. The method of manufacture of claim 1, wherein:
said binder component includes maleic-modified glyceryl ester of rosin.

11. The method of manufacture of claim 1, wherein:
said pigment component is titanium dioxide.

12. The method of manufacture of claim 1, wherein:
said pigment component is C.I. Pigment Yellow 83.

13. The method of manufacture of claim 1, wherein:
said filler component is calcium carbonate.

* * * * *